US008760558B2

(12) United States Patent
Morita et al.

(10) Patent No.: US 8,760,558 B2
(45) Date of Patent: Jun. 24, 2014

(54) COMPOUND LENS IMAGING DEVICE

(75) Inventors: Nobuhiro Morita, Tokyo (JP); Go Maruyama, Kanagawa (JP); Sadao Takahashi, Kanagawa (JP); Jun Watanabe, Kanagawa (JP); Toshimichi Hagiya, Chiba (JP); Shin Aoki, Kanagawa (JP); Ikuo Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 12/959,711

(22) Filed: Dec. 3, 2010

(65) Prior Publication Data
US 2011/0134282 A1 Jun. 9, 2011

(30) Foreign Application Priority Data

Dec. 4, 2009 (JP) ................... 2009-276732

(51) Int. Cl.
H04N 5/225 (2006.01)
(52) U.S. Cl.
USPC .......................... 348/335; 348/340
(58) Field of Classification Search
USPC .................................. 348/340, 335
See application file for complete search history.

(56) References Cited

U.S. PATENT DOCUMENTS

| 5,796,522 | A | 8/1998 | Meyers |
| 2005/0128323 | A1* | 6/2005 | Choi .............................. 348/239 |
| 2005/0134699 | A1* | 6/2005 | Nagashima et al. ......... 348/218.1 |
| 2008/0116359 | A1* | 5/2008 | Asper et al. .................... 250/221 |
| 2010/0097491 | A1* | 4/2010 | Farina et al. ................ 348/223.1 |

FOREIGN PATENT DOCUMENTS

| JP | 4-42207 | 2/1992 |
| JP | 2005-165058 | 6/2005 |
| JP | 2006-251613 | 9/2006 |
| JP | 2007-158825 | 6/2007 |
| JP | 2008-521043 | 6/2008 |
| WO | WO 2006/054198 A1 | 5/2006 |
| WO | WO 2008/085679 A1 | 7/2008 |

OTHER PUBLICATIONS

Extended European Search Report issued Feb. 6, 2012 in patent application No. 10193451.1.
Dmitry Fedorov, et al., "Multi-Focus Imaging Using Local Focus Estimation and Mosaicking", IEEE International Conference on Image Processing, XP031049081, Oct. 1, 2006, pp. 2093-2096.
Partial European Search Report issued May 4, 2011, in Patent Application No. 10193451.1.
Ju-Seog Jang, et al., "Large depth-of-focus time-multiplexed three-dimensional integral imaging by use of lenslets with nonuniform focal lengths and aperture sizes", Optics Letters, vol. 28, No. 20, XP 2633138, Oct. 15, 2003, pp. 1924-1926.
Office Action issued Jun. 5, 2013 in Japanese Patent Application No. 2009-276732.

* cited by examiner

*Primary Examiner* — Roberto Velez
*Assistant Examiner* — Yih-Sien Kao
(74) *Attorney, Agent, or Firm* — Oblon, Spivak, McClelland, Maier & Neustadt, L.L.P.

(57) ABSTRACT

An imaging device includes a lens array including multiple lenses facing a subject; an image sensor obtaining a compound-eye image including single-eye images of the subject formed by the lenses; and a computing unit processing the compound-eye image obtained by the image sensor. The lenses have different radii of curvature and substantially the same back focal length, and the computing unit extracts an in-focus image from the compound-eye image.

8 Claims, 18 Drawing Sheets

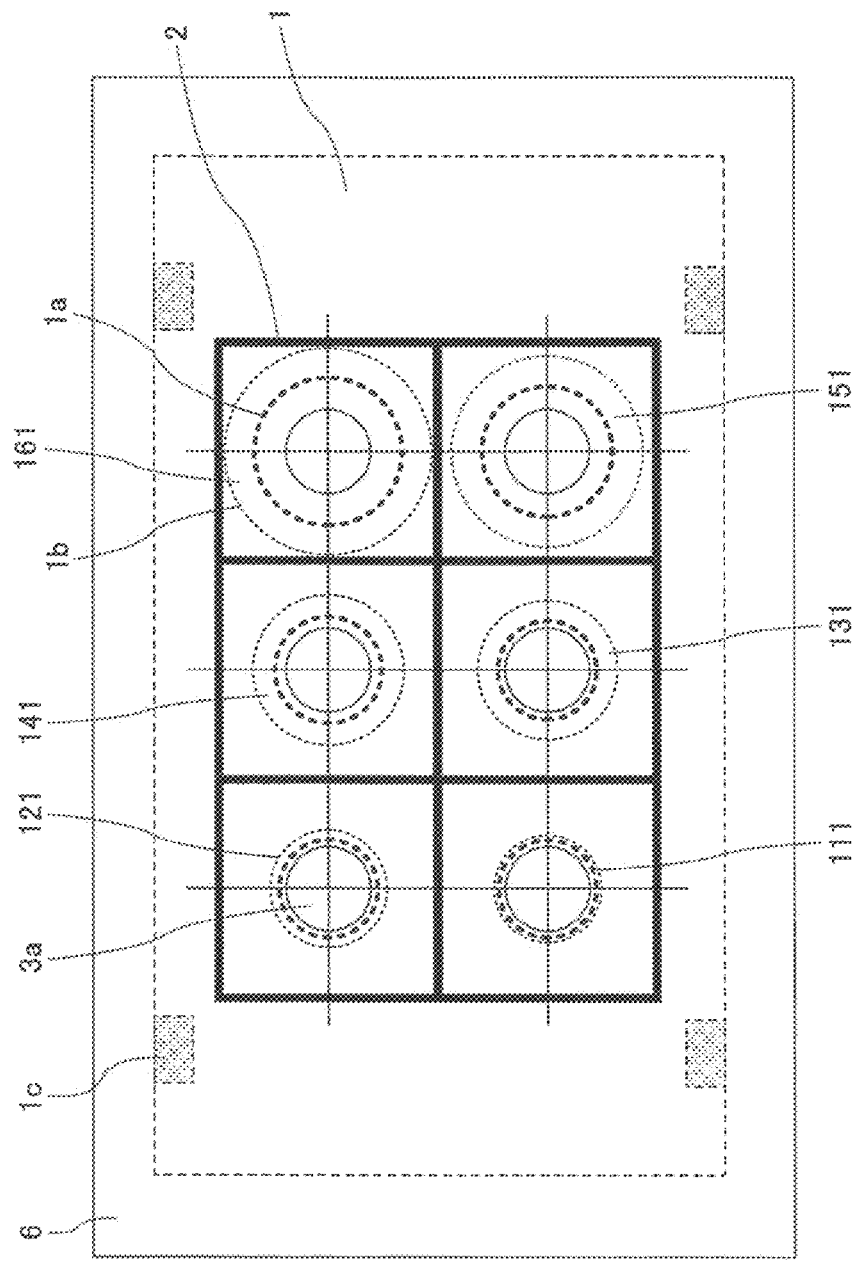

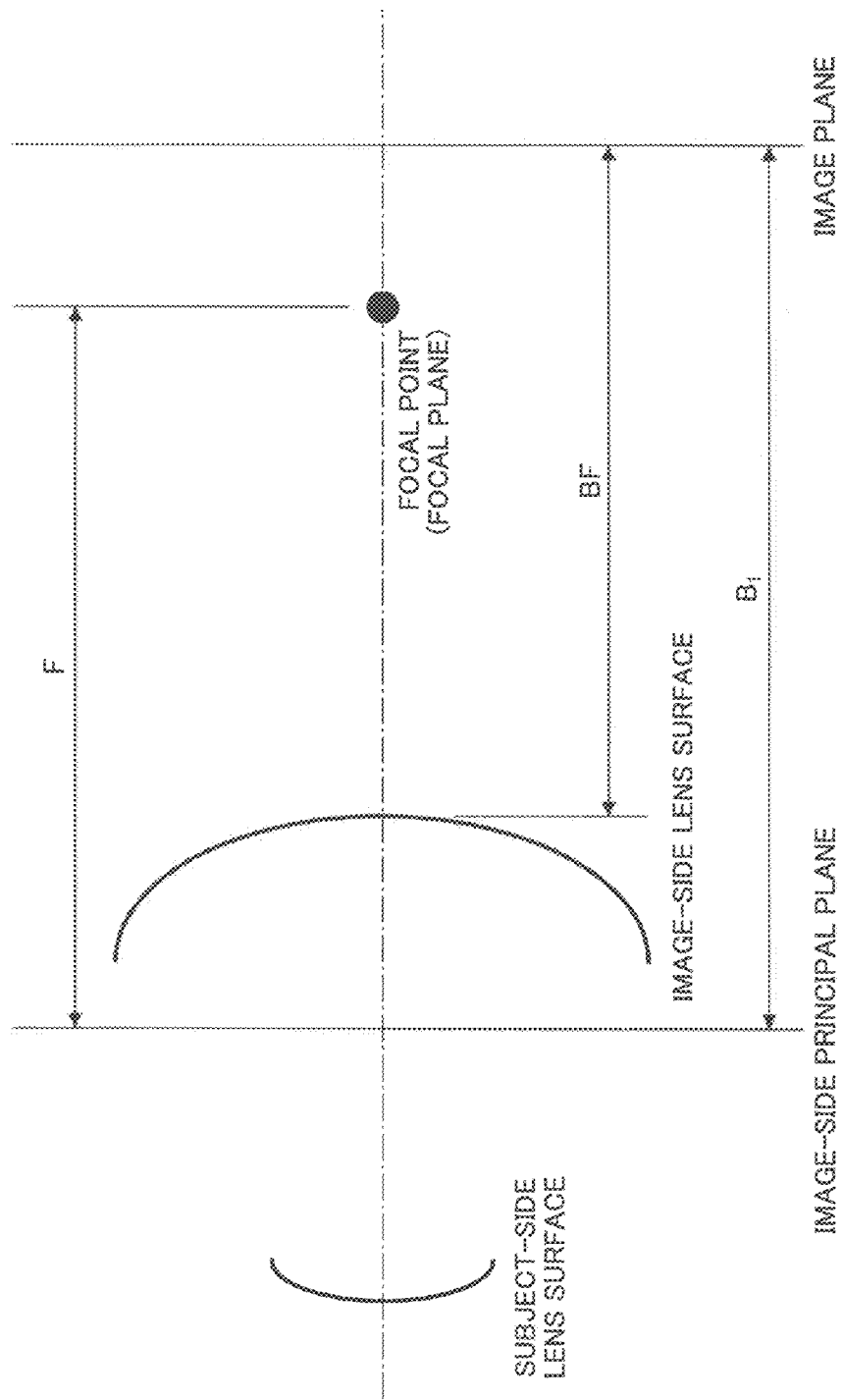

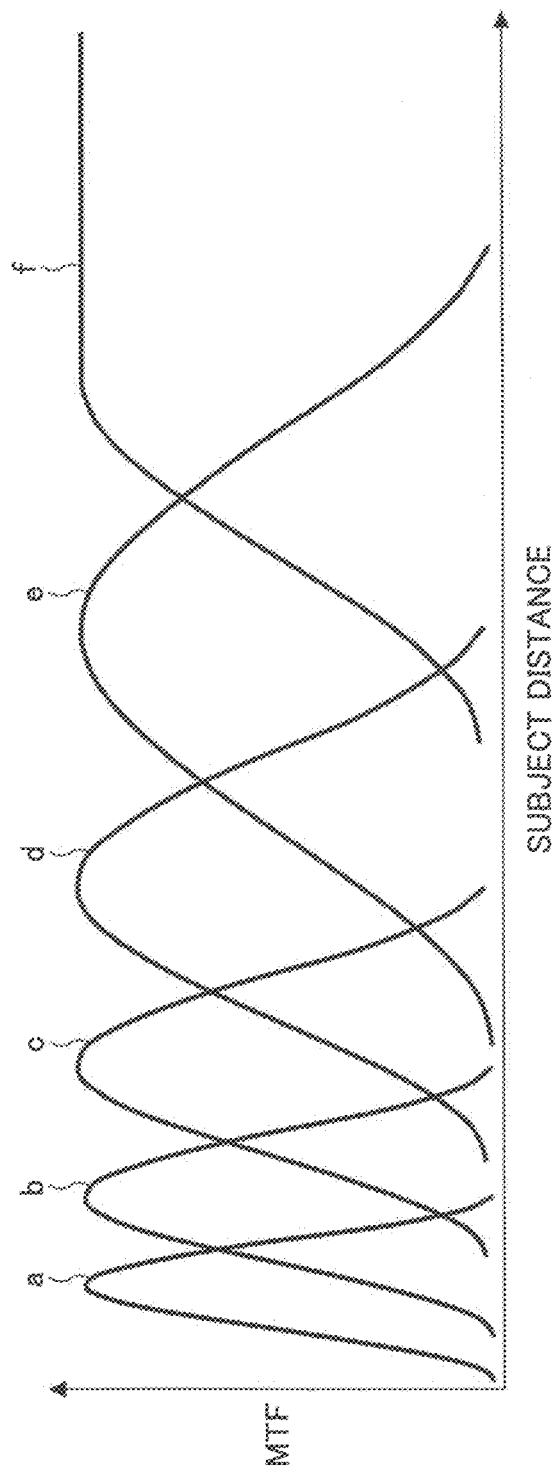

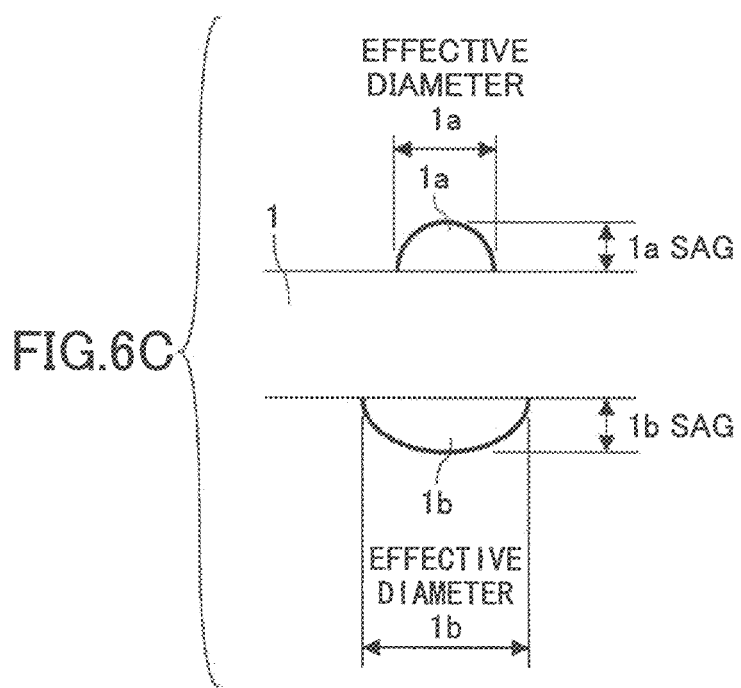

US 8,760,558 B2

COMPOUND LENS IMAGING DEVICE

BACKGROUND OF THE INVENTION

1. Field of the Invention

A certain aspect of the present invention relates to an imaging device.

2. Description of the Related Art

Imaging devices are popularly used as information obtaining units, for example, in portable equipment, on-vehicle equipment, medical equipment, and industrial equipment. There is a growing demand for a thinner and smaller imaging device that can be installed in any apparatus or any place. Also, it is an essential feature of an imaging device to be able to take an image that is in focus (hereafter called an in-focus image) and thereby to obtain accurate information. To obtain an in-focus image at any given subject distance, it is necessary to focus the lens at the subject distance. The focusing function is particularly important when taking a close-up image at a short subject distance because the depth of field becomes small and the image quality varies greatly according to the change of the subject distance.

As an example of a related-art technology for focusing the lens at every subject distance, Japanese Patent Application Publication No. 2005-165058 discloses an automatic focusing technology where the arrangement of lenses is changed according to the subject distance. However, to implement the automatic focusing function, it is necessary to provide multiple lenses and a mechanism for changing the positions of the lenses relative to each other. This in turn complicates the configuration of an imaging device and increases the size and costs of the imaging device.

Meanwhile, Japanese Patent Application Publication No. 2006-251613 and Japanese Patent Application Publication No. 2008-521043 disclose a liquid lens (electrowetting lens) and a liquid-crystal lens the radii of curvature of which can be changed by applying a voltage. However, these lenses consume a large amount of power. Also, since these lenses are made of fluid and movable, they have low durability and low environmental resistance.

As still another example of a related-art technology, Japanese Patent Application Publication No. 2007-158825 discloses a method for obtaining an image that is in focus at multiple subject distances. In this method, a lens array composed of multiple lens sets with different focal lengths is used to obtain a compound-eye image, pixels at specific positions are extracted from the compound-eye image, and a single-eye image is reconstructed from the extracted pixels. In this method, however, since the back focal lengths of the lenses constituting the lens array are not defined, the lenses have different imaging distances and optical magnifications and form single-eye images with different sizes. This in turn complicates a process of extracting an in-focus single-eye image or pixels from an obtained compound-eye image and a process to be performed on the extracted in-focus single-eye image or pixels.

SUMMARY OF THE INVENTION

In an aspect of this disclosure, there is provided an imaging device that includes a lens array including multiple lenses facing a subject; an image sensor obtaining a compound-eye image including single-eye images of the subject formed by the lenses; and a computing unit processing the compound-eye image obtained by the image sensor. The lenses have different radii of curvature and substantially the same back focal length, and the computing unit extracts an in-focus image from the compound-eye image.

BRIEF DESCRIPTION OF THE DRAWINGS

FIG. 2 is a drawing illustrating a surface of a lens array shown in FIG. 1;

FIGS. 4A and 4B are drawings used to compare lens parameters of lens sets (lenses) of a lens array;

FIG. 5 is a graph showing through-focus MTFs of lens sets constituting the lens array of the imaging device shown in FIG. 1;

FIGS. 6A through 6C are drawings used to describe changes in lens sags and effective diameters of lenses when the radii of curvature of the lenses are changed;

DESCRIPTION OF THE PREFERRED EMBODIMENTS

Preferred embodiments of the present invention are described below with reference to the accompanying drawings.

Figure 1:
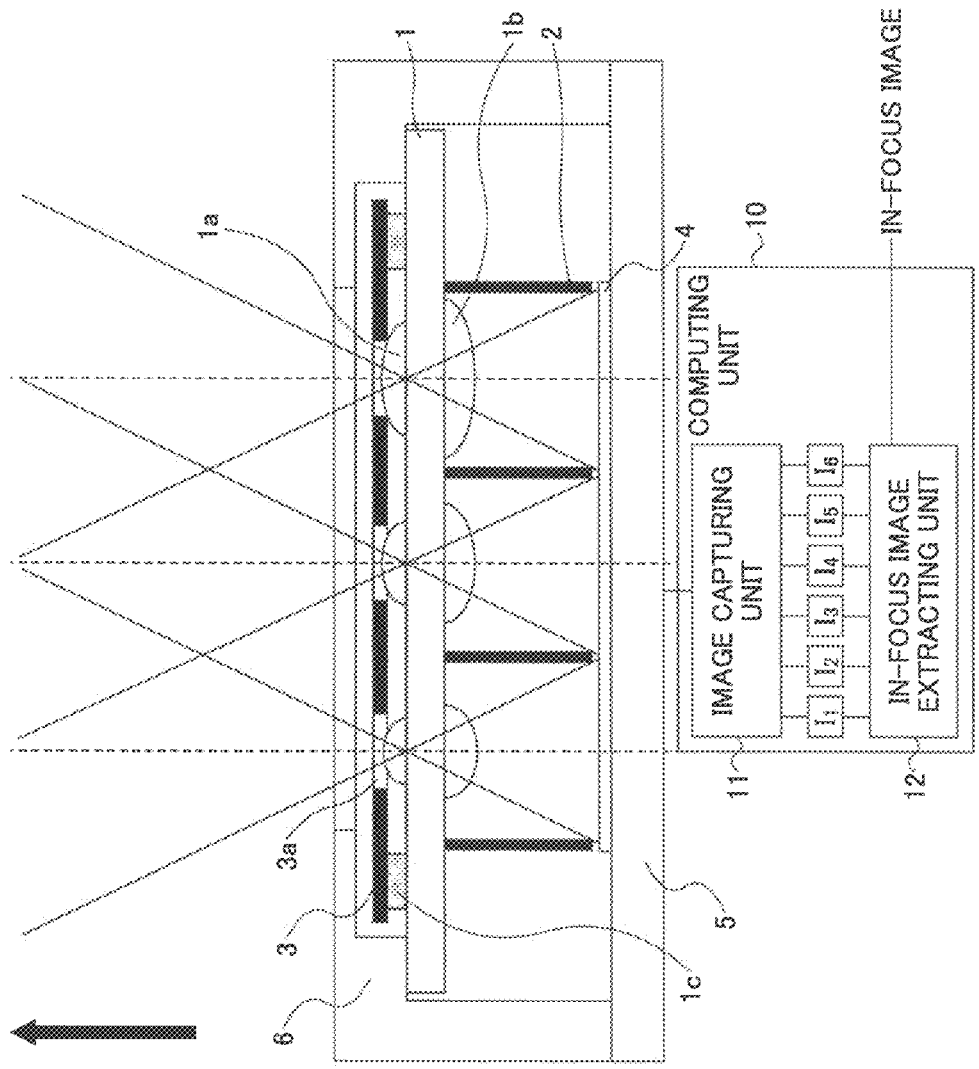
FIG. 1 is a drawing illustrating a configuration of an imaging device according to an embodiment of the present invention.

An imaging device according to an embodiment of the present invention is described below with reference to FIGS. 1 and 2. As shown in FIG. 1, the imaging device includes an imaging unit for obtaining an image (compound-eye image) of a subject and a computing unit 10 for extracting an in-focus image from the obtained compound-eye image. In FIG. 1, it is assumed that the subject is present in the direction indicated by an arrow. FIG. 2 is a drawing illustrating the imaging unit seen from the position of the subject. In FIGS. 1 and 2, the same reference numbers are assigned to the same components.

Referring to FIG. 1, the imaging unit includes a lens array 1. The lens array 1 has a subject-side surface facing the subject and an image-side surface facing the image plane. The lens array 1 is configured as a double-sided lens array having lenses on the subject-side and image-side surfaces. Lenses 1a are provided on the subject-side surface facing the subject and lenses 1b are provided on the image-side surface facing the image plane. Each pair of the lens 1a and the lens 1b constitutes a lens set that forms an image of the subject on the image plane. As shown in FIG. 2, the lens array 1 of this embodiment includes six lens sets 111, 121, 131, 141, 151, and 161.

The imaging unit also includes light-shielding walls 2 for preventing crosstalk between light beams passing through adjacent lens sets of the lens array 1. The light-shielding walls 2 are made of an opaque material such as metal or resin that does not allow light to pass through. As shown in FIG. 2, the light-shielding walls 2 form rectangular spaces corresponding to the lens sets 111-161 of the lens array 1. The light-shielding walls 2 are bonded to a flat part of the image-side surface of the lens array 1. The imaging unit also includes an opening array 3 made of a plate material where circular holes (openings) 3a having substantially the same diameter are formed for the respective lens sets 111-161. The openings 3a are used as diaphragms (lens stops). The opening array 3 is bonded to the lens array 1 via protrusions 1c provided at four corners of a flat part of the subject-side surface of the lens array 1. The imaging unit also includes an image sensor 4 such as a CMOS sensor that converts optical images of the subject formed by the lens sets 111-161 of the lens array 1 into an image signal (data). The image sensor 4 is mounted on a substrate 5. Although not shown in FIG. 1, components such as an optical low-pass filter for preventing aliasing and a cover glass for protecting the image sensor 4 may also be provided. The imaging unit further includes a housing 6. The housing 6 houses the lens array 1, the light-shielding walls 2, the opening array 3, and the image sensor 4. A part of the subject-side surface of the lens array 1 and a part of the substrate 5 are bonded to the housing 6.

The computing unit 10 receives an image signal or image data (compound-eye image) obtained by the image sensor 4 and extracts an in-focus image from the compound-eye image. The computing unit 10 includes an image capturing unit 11 and an in-focus image extracting unit 12.

Figure 3A:
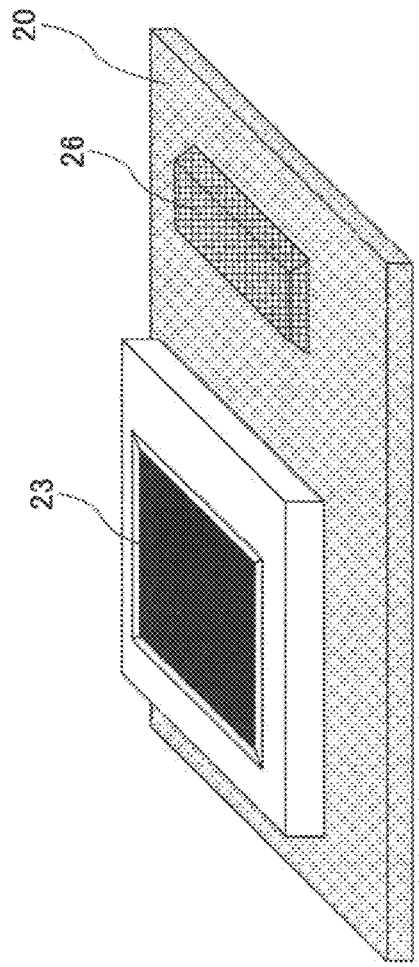
FIG. 3A is a drawing illustrating an imaging unit and a processing unit of an imaging device.
Figure 3B:
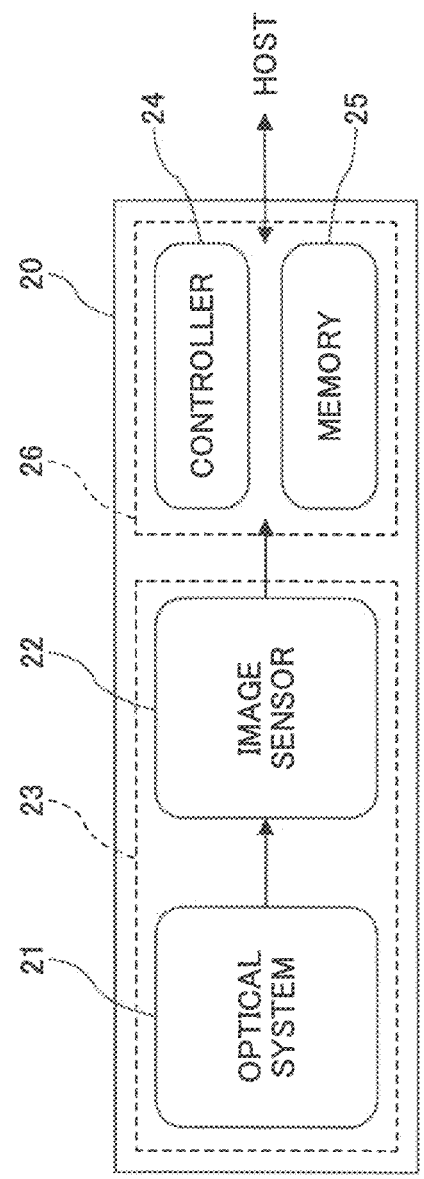
FIG. 3B is a drawing illustrating components of the imaging unit and the processing unit shown in FIG. 3A.

FIG. 3A shows an imaging device including an imaging unit 23 and a processing unit 26 formed on a substrate 20. FIG. 3B shows components of the imaging unit 23 and the processing unit 26. The imaging unit 23 includes an optical system 21 and an image sensor (CMOS sensor) 22. The processing unit 26 includes a controller 24 and a memory 25. The imaging unit 23 corresponds to the imaging unit described with reference to FIGS. 1 and 2. The controller 24 of the processing unit 26 includes the computing unit 10 of FIG. 1. The memory 25 stores image data and other data being processed. The substrate 20 of FIGS. 3A and 3B corresponds to the substrate 5 of FIG. 1. The size of the substrate 20 is, for example, 20 mm×15 mm.

Referring back to FIGS. 1 and 2, the lens array 1 is described in more detail. Lens surfaces of the lens sets 111-161 of the lens array 1 have different radii of curvature so that the lens sets 111-161 focus at different subject distances.

In this embodiment, all the lens sets (lenses) constituting the lens array have substantially the same focal length and/or back focal length, but focus at different subject distances.

Figure 4B:
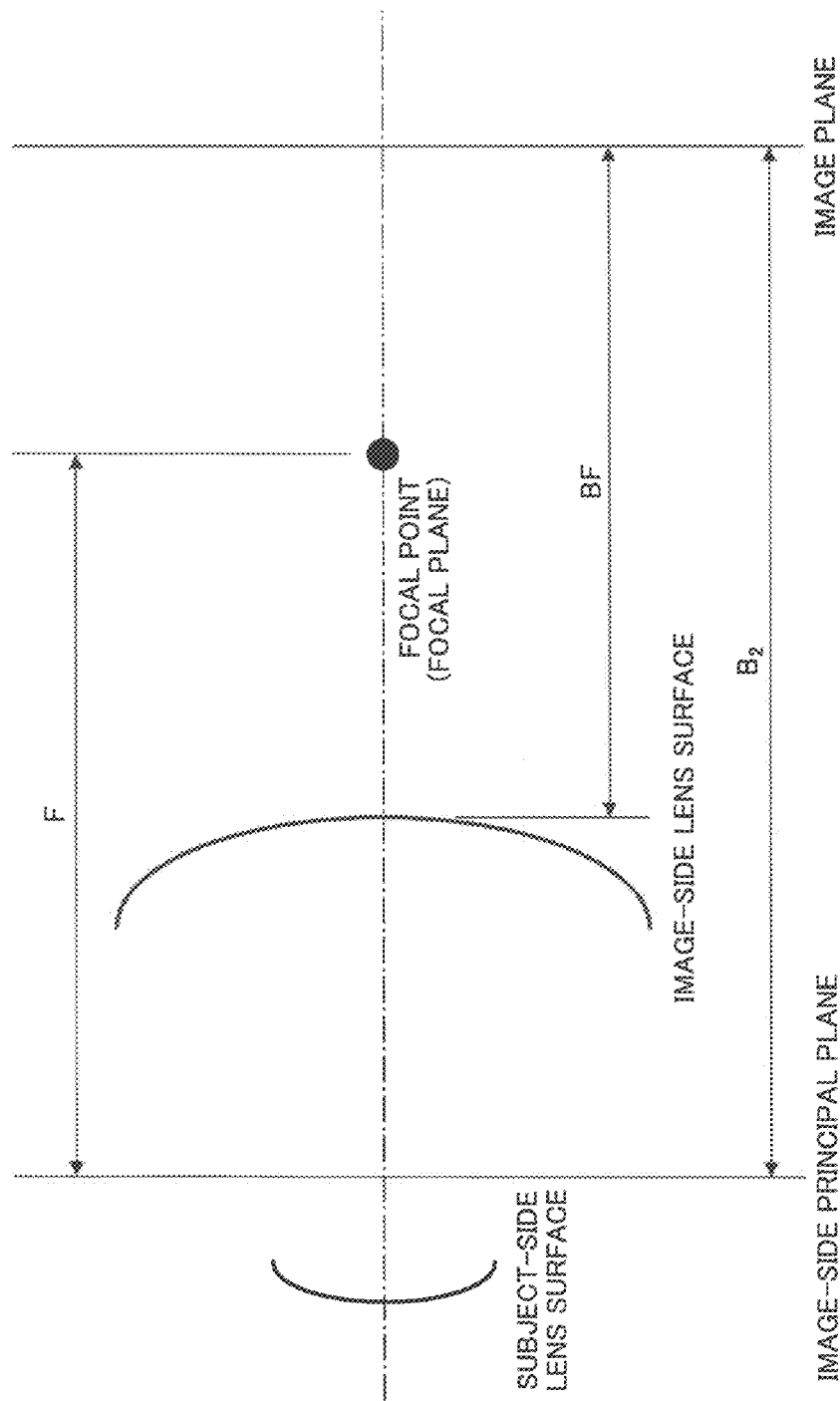

FIGS. 4A and 4B show lens parameters of lens sets (lenses) of the lens array. In FIGS. 4A and 4B, the left side corresponds to the subject side facing the subject and the right side corresponds to the image side facing the image plane. Each lens (or lens set) has two curved surfaces: the subject-side surface and the image-side surface. "F" indicates the focal length of the lens; "BF" indicates the distance from the image-side surface of the lens to the image plane, i.e., the back focal length; and "B" indicates the distance from the image-side principal plane to the image plane, i.e., the image distance. FIGS. 4A and 4B show two lenses $1_1$ and $1_2$ that have substantially the same focal length and back focal length, but focus at different subject distances.

The paraxial imaging equation of the lens is shown below. In the equation, F indicates a focal length, A indicates a subject distance, and B indicates an image distance.

$$\frac{1}{F} = \frac{1}{A} + \frac{1}{B} \qquad (1)$$

To configure the lens $1_1$ of FIG. 4A to focus at a subject distance longer than the subject distance at which the lens $1_2$ of FIG. 4B focuses (i.e., $A_1 > A_2$) when the lens $1_1$ and the lens $1_2$ have the same focal length F, it is necessary to set the radii of curvature of the lens surfaces such that the image distance $B_1$ of the lens $1_1$ becomes less than the image distance $B_2$ of the lens $1_2$ ($B_1 < B_2$). In other words, the lens $1_1$ and the lens $1_2$ can be configured to have substantially the same focal length and/or back focal length but to focus at different subject distances by setting the radii of curvature of the lens surfaces such that the position of the principal plane of the lens $1_2$ becomes closer to the subject than the position of the principal plane of the lens $1_1$.

FIG. 5 is a graph showing through-focus modulation transfer functions (MTF) of the lens sets 111-161 constituting the lens array 1. In FIG. 5, "a" through "f" indicate the through-focus MTFs of the lens sets 111-161. Since the lens sets 111-161 focus at different subject distances, the MTFs of the lens sets 111-161 show peaks at different subject distances. When the subject distance is short (e.g., several mm), the depth of field is very small (as shown by "a" in FIG. 5). Therefore, even when the lens set becomes out of focus only slightly, the MTF (contrast) decreases and the image is blurred. Meanwhile, the depth of field becomes larger as the subject distance becomes longer. For example, as indicated by "f" shown in FIG. 5, the image is not blurred from a certain subject distance to infinity.

In this embodiment, lenses of the lens array are designed such that the through-focus MTFs of the lenses cross each other at a constant contrast level, and a single-eye image or a pixel obtained by a lens having an appropriate MTF is selected according to the subject distance. This configuration makes it possible to focus on a subject at any distance from several mm to infinity.

In addition to setting the radii of curvature as described above, the lens sets 111-161 are configured to have substantially the same back focal length. The back focal length indicates the distance from the apex of the image-side lens 1b to the image plane. When all the lens sets have substantially the same back focal length, the optical magnifications of the lens sets are determined substantially solely by the subject distance. Therefore, even when the degrees of focus (or defocus) of images obtained by the lens sets are different, the sizes of the images are substantially the same. With this configuration, when extracting an in-focus single-eye image from an obtained compound-eye image or synthesizing an in-focus image from in-focus pixels extracted from the compound-eye image, it is not necessary to consider the difference in the size of images obtained by the lens sets. This configuration also eliminates the need to consider the difference in the size of images when analyzing the images to obtain information.

Figure 6A:
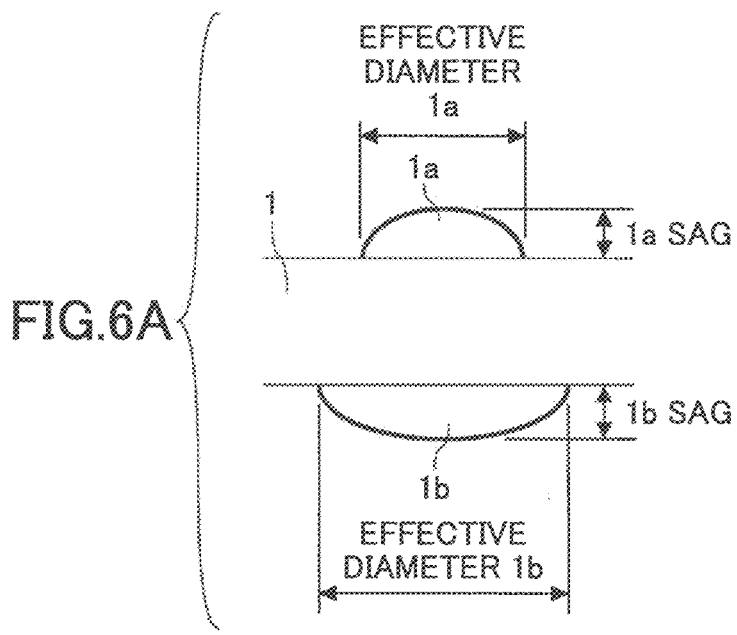
Figure 6B:
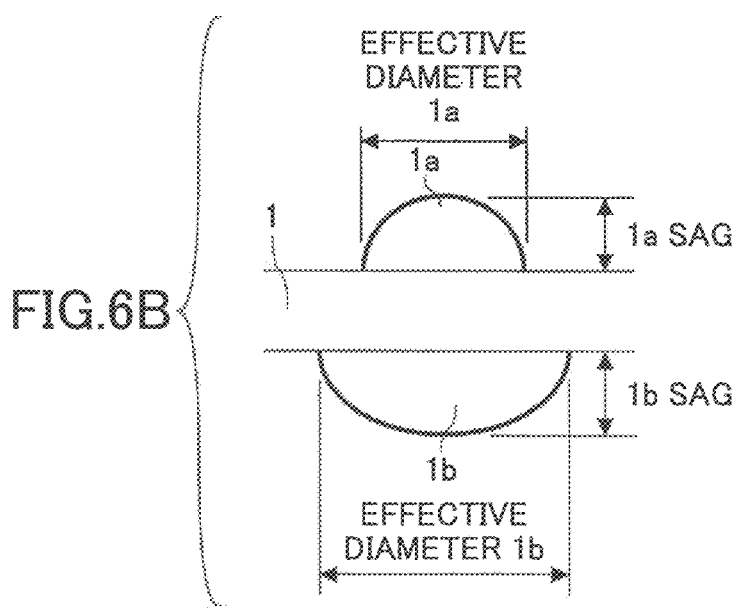

FIGS. 6A through 6C are drawings used to describe changes in lens sags and effective diameters of lenses when the radii of curvature of the lenses are changed while keeping the back focal lengths of the lenses at substantially the same value. To change the radii of curvature of the lens 1a and the lens 1b shown in FIG. 6A without changing their effective diameters, it is necessary to change the sags of the lenses as shown in FIG. 6B. Changing the sags of lenses results in different heights of lenses constituting the lens array and complicates the shape of the lens array. Meanwhile, to change the radii of curvature of the lenses without changing the sags of the lenses, it is necessary to change the effective diameters of the lenses as shown in FIG. 6C. Changing the effective diameters causes the lenses to have different optical characteristics such as the cutoff frequencies and the brightness that depend on the effective diameters. This in turn makes it necessary to adjust obtained images to compensate for the difference in the optical characteristics and thereby complicates image processing.

In the configuration shown by FIGS. 1 and 2, the radii of curvature of the lenses are changed while keeping the sags of the lenses at substantially the same value, and the opening array 3 having the openings 3a with substantially the same diameter is provided on the subject-side surface of the lens array 1 so that the effective diameters of the lenses become substantially the same. This configuration makes it possible to make the effective diameters of the lenses of the lens array 1 substantially the same and thereby to prevent problems caused by different effective diameters. Since the lenses have different radii of curvature, the lenses of the lens array 1 may contact the opening array 3 at different positions. In this embodiment, to prevent the opening array 3 from being tilted when brought into contact with the lens array 1, the opening array 3 is placed on the protrusions 1c formed on the flat part of the lens array 1 as shown in FIG. 1.

In FIG. 2 where the imaging unit is seen from the position of the subject, the openings (effective diameters) 3a are indicated by circles drawn by solid lines on the lens sets 111-161 and the openings 3a have substantially the same diameter. Circles indicated by bold dashed lines indicate the diameters of the subject-side lenses 1a including the ineffective area (a part of the lens outside of the effective diameter). Circles indicated by dotted lines indicate the diameters of the image-side lenses 1b. Since the lenses have different radii of curvature and substantially the same sag, the diameters of the lenses of one lens set indicated by the bold dashed line and the dotted line are different from those of another lens set.

Figure 7:
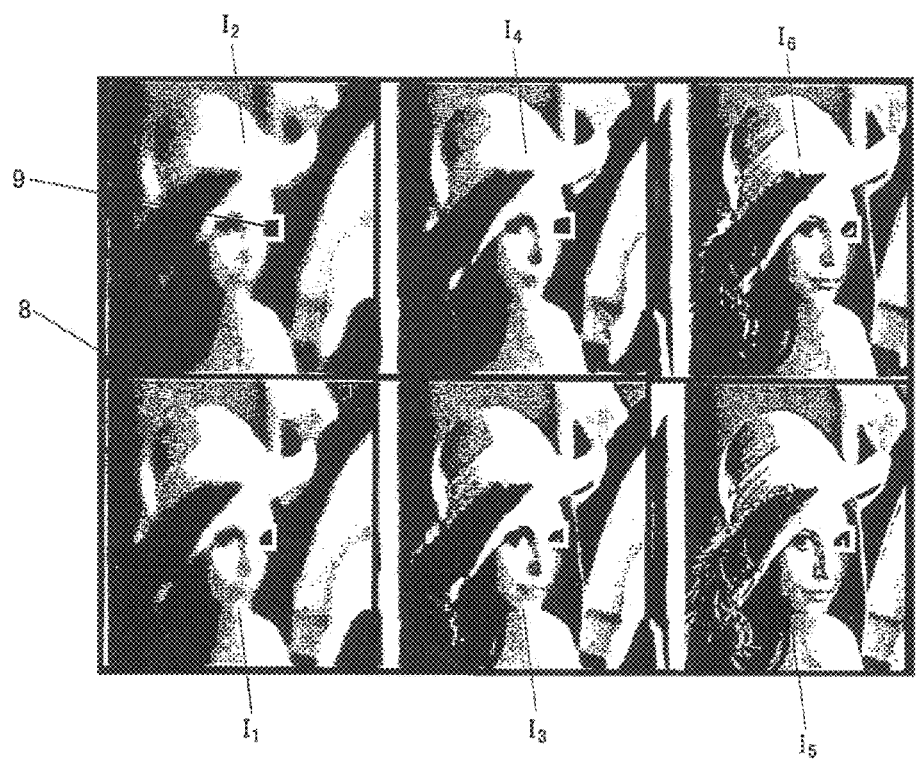
FIG. 7 is an exemplary compound-eye image obtained through the lens array of the imaging device shown in FIG. 1.

Next, images obtained by the imaging device shown by FIGS. 1 and 2 are described. In this embodiment, a compound-eye image 8 as shown by FIG. 7 is obtained by the image sensor (CMOS sensor) 4. In FIG. 7, $I_1$ through $I_6$ indicate single-eye images corresponding to the lens sets 111-161 of the lens array 1. Since the number of the lens sets 111-161 is six, the number of the single-eye images is six. Black areas surrounding the respective single-eye images represent shadows caused by the light-shielding walls 2. Since the lens sets 111-161 have substantially the same back focal length, the imaging distances and the optical magnifications of the lens sets 111-161 become substantially the same. Therefore, the sizes of the single-eye images $I_1$ through $I_6$ are substantially the same. Meanwhile, since the lens sets 111-161 focus at different subject distances depending on the radii of curvature of the lenses, the degrees of focus (the degrees that images are in focus) of the single-eye images are different from each other. In FIG. 7, the single-eye image $I_5$ is in focus.

Next, operations of the computing unit 10 shown in FIG. 1 are described. The image capturing unit 11 captures (or receives) the compound-eye image 8 shown in FIG. 7 obtained by the image sensor 4, separates the compound-eye image 8 into the single-eye images $I_1$ through $I_6$, and transfers the single-eye images $I_1$ through $I_6$ to the in-focus image extracting unit 12. The in-focus image extracting unit 12 processes the single-eye images $I_1$ through $I_6$ received from the image capturing unit 11 and outputs an in-focus image. For example, the in-focus image extracting unit 12 selects one of the single-eye images $I_1$ through $I_6$ that is most in focus as an in-focus image, or extracts pixels that are most in focus from the single-eye images $I_1$ through $I_6$ and synthesizes an in-focus image from the extracted pixels.

Methods of obtaining an in-focus image from multiple single-eye images according to embodiments of the present invention are described below.

<First Embodiment>

In a first embodiment, one of single-eye images having the highest luminance difference between pixels is selected as the in-focus image. When an image is in focus, the contrast of the image becomes high and the luminance difference between a pixel having the highest luminance level and a pixel having the lowest luminance level in the image becomes large. Based on this fact, the highest luminance level and the lowest luminance level of pixels in each single-eye image are detected and a single-eye image where the difference between the highest and lowest luminance levels is the highest among the single-eye images is extracted as the in-focus image. In the example of FIG. 7, the single-eye image $I_5$ is extracted as the in-focus image.

Figure 8:
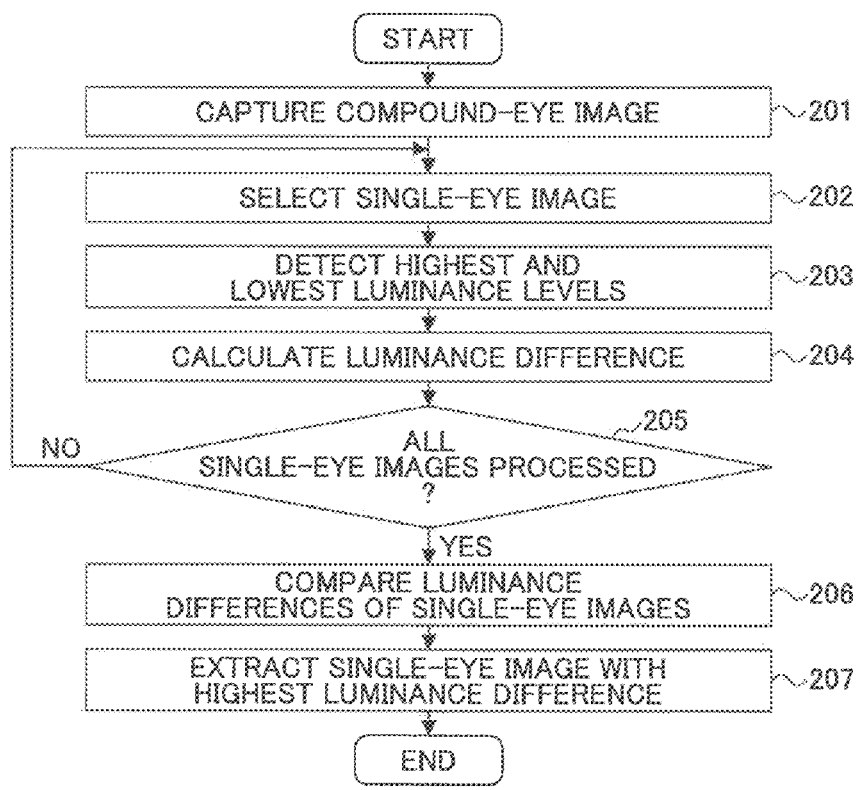
FIG. 8 is a flowchart showing a process of extracting an in-focus image according to a first embodiment.

FIG. 8 is a flowchart showing a process of extracting an in-focus image according to the first embodiment. The image capturing unit 11 captures (or receives) the compound-eye image 8 shown in FIG. 7 obtained by the image sensor 4 and separates the compound-eye image 8 into the single-eye images $I_1$ through $I_6$ (step 201). The image capturing unit 11 transfers the single-eye images $I_1$ through $I_6$ to the in-focus image extracting unit 12. The in-focus image extracting unit 12 processes the single-eye images $I_1$ through $I_6$ and extracts one of the single-eye images $I_1$ through $I_6$ that is most in focus. More specifically, the in-focus image extracting unit 12 selects one of the single-eye images (step 202), detects the highest luminance level and the lowest luminance level of pixels constituting the selected single-eye image (step 203), and calculates the difference (luminance difference) between the highest luminance level and the lowest luminance level (step 204). The in-focus image extracting unit 12 repeats steps 202 through 204 for each of the remaining single-eye images (step 205). Then, the in-focus image extracting unit 12 compares the luminance differences of the single-eye images (step 206) and extracts one of the single-eye images ($I_5$ in FIG. 7) having the highest luminance difference as the in-focus image that is most in focus (step 207).

Thus, in this embodiment, one of single-eye images that is most in focus is extracted as an in-focus image. This method makes it possible to obtain an in-focus image through a simple process.

<Second Embodiment>

In a second embodiment, a pixel having the extreme luminance level (the highest luminance level or the lowest luminance level) is extracted from each set of corresponding pixels, which correspond to the same field of view, of single-eye images, and an in-focus image is synthesized from the extracted pixels (pixels extracted from all sets of corresponding pixels).

Since the lens sets 111-161 of the lens array 1 obtain single-eye images of the same subject, the single-eye images include corresponding pixels (corresponding points) representing the same part of the subject. The luminance levels of the corresponding pixels of the single-eye images representing a given part of the subject vary depending on the degrees of focus of the pixels. Take, for example, pixels 9 (corresponding to an eye of the subject) shown in FIG. 7. The luminance levels of the pixels 9 of the single-eye images $I_1$ through $I_6$ are detected. When a pixel is in focus, a dark part becomes darker and a bright part becomes brighter. Therefore, a pixel having the extreme luminance level (the highest luminance level for a bright part or the lowest luminance level for a dark part) is extracted as a most-in-focus pixel from the corresponding pixels of the single-eye images. This process is repeated for all sets of corresponding pixels of the single-eye images to extract pixels with the extreme luminance levels and an in-focus image is synthesized from the extracted pixels.

Figure 9:
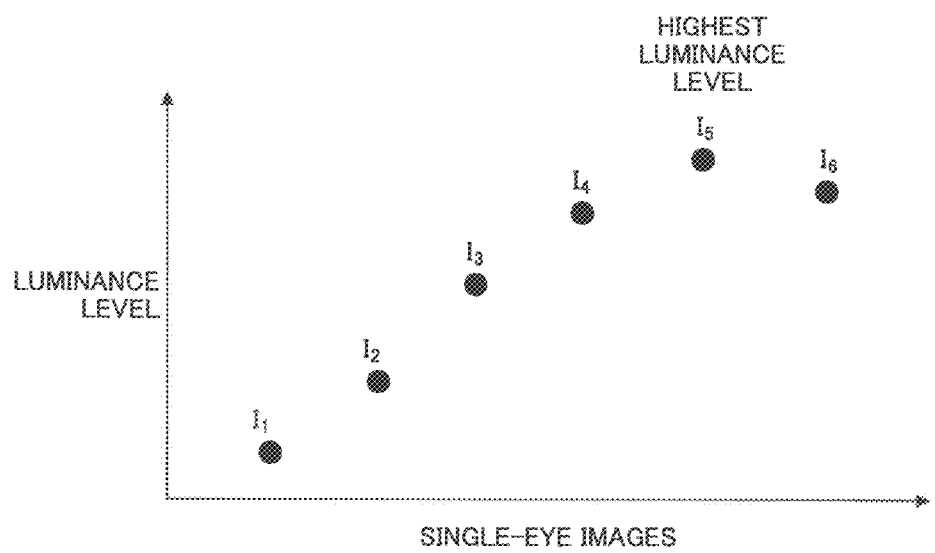
FIG. 9 is a graph showing luminance levels of corresponding pixels of single-eye images.

FIG. 9 is a graph showing exemplary luminance levels of the pixels 9 (corresponding points) of the single-eye images $I_1$ through $I_6$. In this example, the pixel 9 of the single-eye image $I_5$ has the highest luminance level and is therefore extracted as an in-focus pixel. An in-focus pixel may be extracted based on discrete luminance levels of pixels as shown in FIG. 9. Alternatively, an approximate curve of the luminance levels of the corresponding pixels may be obtained and a pixel with the extreme value of the approximate curve may be extracted as an in-focus pixel. This approach makes it possible to more accurately obtain an in-focus pixel.

Figure 10:
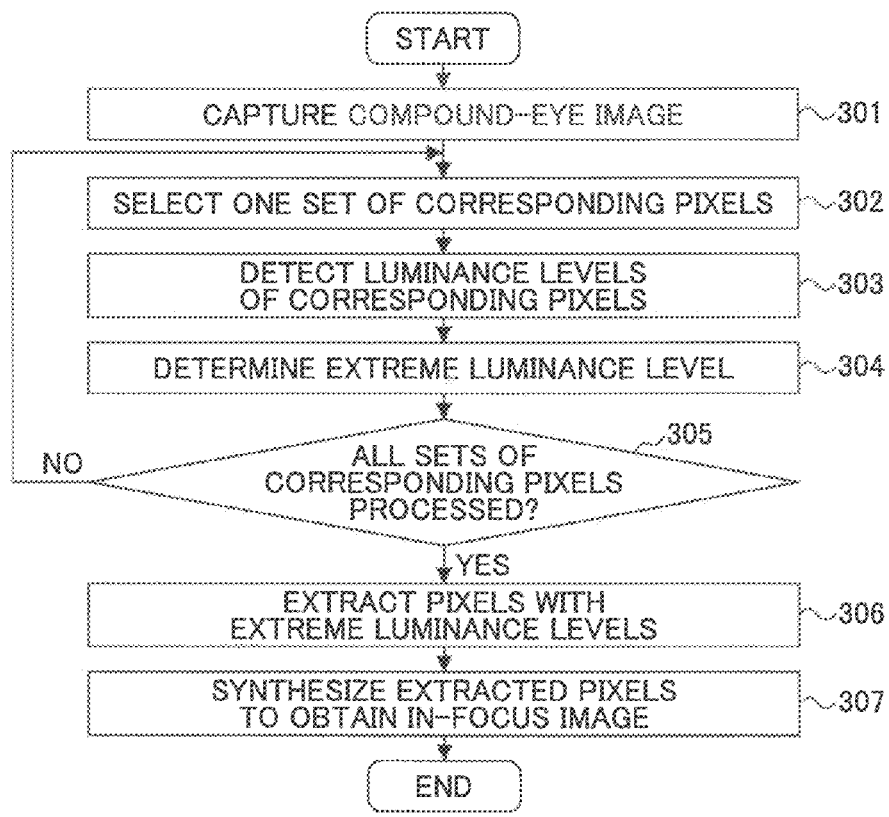
FIG. 10 is a flowchart showing a process of extracting an in-focus image according to a second embodiment.

FIG. 10 is a flowchart showing a process of extracting an in-focus image according to the second embodiment. The image capturing unit 11 captures (or receives) the compound-eye image 8 shown in FIG. 7 obtained by the image sensor 4 and separates the compound-eye image 8 into the single-eye images $I_1$ through $I_6$ (step 301). The image capturing unit 11 transfers the single-eye images $I_1$ through $I_6$ to the in-focus image extracting unit 12.

The in-focus image extracting unit 12 selects one set of corresponding pixels (or points) of the single-eye images $I_1$ through $I_6$ (step 302). Next, the in-focus image extracting unit 12 detects the luminance levels of the selected set of corresponding points (step 303) and determines the extreme luminance level (the highest luminance level or the lowest luminance level) among the detected luminance levels (step 304). The in-focus image extracting unit 12 repeats steps 302 through 304 for each of the remaining sets of corresponding pixels (or points) (step 305). Then, the in-focus image extracting unit 12 extracts all pixels with the determined extreme luminance levels (step 306) and synthesizes the extracted pixels to obtain an in-focus image (step 307).

Thus, in this embodiment, a most-in-focus pixel is extracted from each set of the corresponding pixels of single-eye images, and the extracted most-in-focus pixels are synthesized to obtain an in-focus image. This method makes it possible to more accurately obtain an in-focus image.

<Third Embodiment>

A third embodiment is a variation of the second embodiment. Since lenses (or lens sets) of the lens array are arranged at a predetermined pitch, the direction of a subject viewed from one lens differs from the direction of the subject viewed from another lens. Therefore, single-eye images obtained by the lenses have parallaxes, and the parallaxes change depending on the subject distance. When the subject is at a distant position, the parallaxes become small and can be ignored. Meanwhile, when the subject is at a close position, the parallaxes become large and this makes it difficult to accurately determine the corresponding pixels (or points) in determining a pixel with the extreme luminance level. In this case, it is preferable to determine the corresponding pixels taking into account the parallaxes before determining a pixel with the extreme luminance level. The parallaxes between single-eye images of a subject are obtained by calculating the cross correlation between small areas of the single-eye images and the correspondence of pixels of the single-eye images is corrected based on the obtained parallaxes. More specifically, the corresponding small areas of two single-eye images, for example, the single-eye images $I_5$ and $I_6$, and the positions of the small areas are determined, and the parallax between the determined positions is obtained. Since the pitch between the lenses of the lens array is constant, once the parallax(es) between a pair of single-eye images (e.g., $I_5$ and $I_6$) is obtained, the parallaxes at the positions of the corresponding small areas of other single-eye images (e.g., $I_1$ through $I_4$) can be calculated based on the obtained parallax(es) between the pair of single-eye images, and the corresponding pixels (or points) can be determined based on the calculated parallaxes. In this embodiment, the corresponding pixels (points) of the single-eye images are determined as described above and pixels with the extreme luminance levels are extracted from the determined corresponding pixels. This method makes it possible to more accurately extract an in-focus image.

Figure 11:
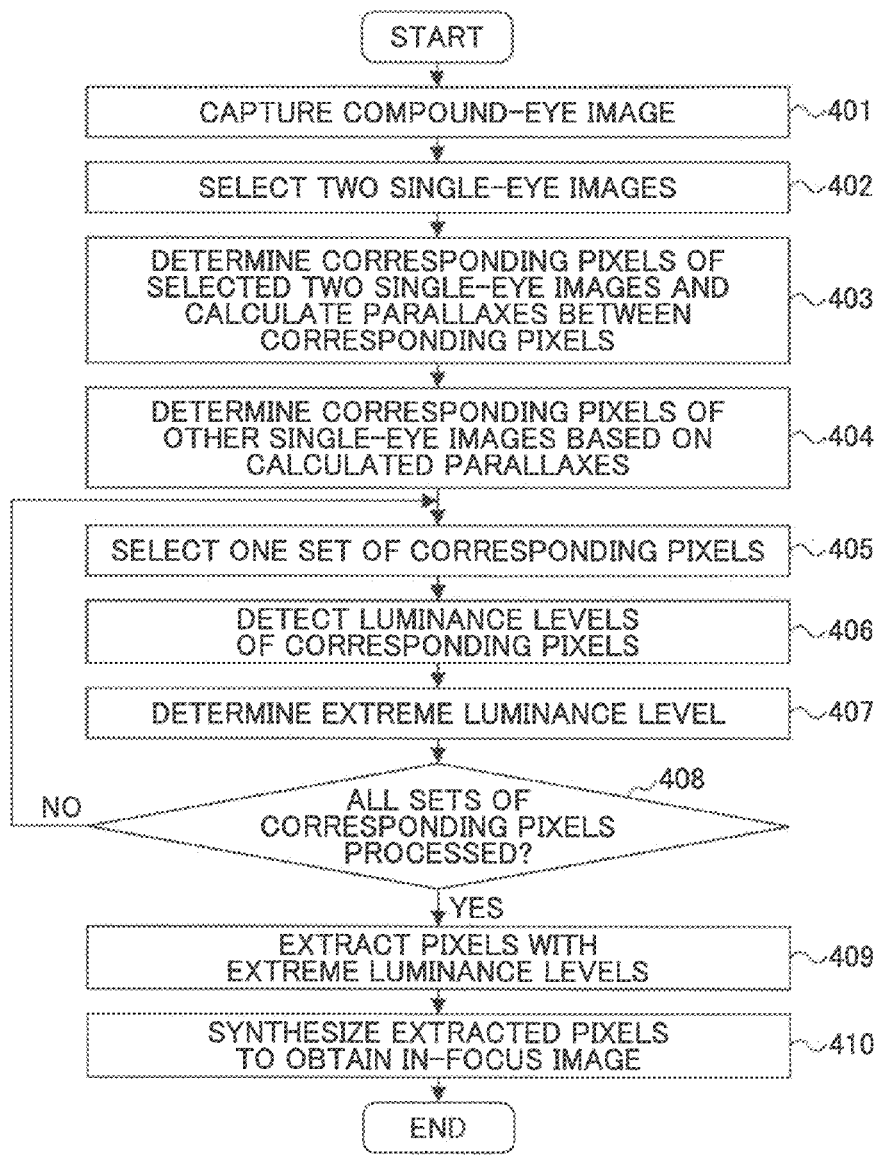
FIG. 11 is a flowchart showing a process of extracting an in-focus image according to a third embodiment.

FIG. 11 is a flowchart showing a process of extracting an in-focus image according to the third embodiment. The image capturing unit 11 captures (or receives) the compound-eye image 8 shown in FIG. 7 obtained by the image sensor 4 and separates the compound-eye image 8 into the single-eye images $I_1$ through $I_6$ (step 401). The image capturing unit 11 transfers the single-eye images $I_1$ through $I_6$ to the in-focus image extracting unit 12.

The in-focus image extracting unit 12 selects two of the single-eye images $I_1$ through $I_6$ (e.g., $I_5$ and $I_6$) (step 402). Next, the in-focus image extracting unit 12 determines the corresponding pixels (or points) of the selected two single-eye images (step 403). In this step, for example, a small area of the single-eye image $I_5$ is selected. For each of small areas of the single-eye image $I_6$ within a range from a position corresponding to the position of the selected small area of the single-eye image $I_5$, the sum of absolute differences (SAD) of luminance or the sum of squared differences (SSD) of luminance with respect to the selected small area of the single-eye image $I_5$ is obtained. Next, one of the small areas of the single-eye image $I_6$ providing the smallest value of the SAD or the SSD is selected as the small area corresponding to the small area of the single-eye image $I_5$. Then, the positions of the corresponding small areas of the single-eye images $I_5$ and $I_6$ and the parallax between the positions of the corresponding small areas are obtained. The above process is repeated for each of the remaining pixels. Any known method may be used for calculating the parallax. Instead of using the luminance levels to calculate the SAD or the SSD, values obtained by differentiating the luminance levels may be used. Next, the in-focus image extracting unit 12 calculates the parallaxes at the positions of the corresponding small areas of other single-eye images (e.g., $I_1$ through $I_4$) based on the parallaxes between the two single-eye images (e.g., $I_5$ and $I_6$) and determines the corresponding pixels (or points) based on the calculated parallaxes (step 404). That is, the corresponding pixels (or points) of the single-eye images are shifted according to the parallaxes. The subsequent steps (steps 405 through 410) are substantially the same as the corresponding steps in FIG. 10 and therefore their descriptions are omitted here.

In this embodiment, the corresponding pixels of single-eye images are determined taking into account the parallaxes between the singe-eye images before extracting pixels with the extreme luminance levels. This method makes it possible to more accurately extract an in-focus image.

<Fourth Embodiment>

A fourth embodiment is a variation of the third embodiment. The accuracy of determining corresponding pixels (or points) based on the parallax can be improved by using two single-eye images that are as far away as possible from each other. Also, the accuracy of obtaining the parallax can be improved by using two single-eye images that are nearly in focus. For the above reasons, in this embodiment, instead of selecting two single-eye images at random as in the third embodiment, two single-eye images that are nearly in focus are selected first, the corresponding pixels (or points) of the selected two single-eye images are determined based on the parallax, and then pixels with the extreme luminance levels are extracted to synthesize an in-focus image. In this process, the method of the second embodiment is used to determine pixels with the extreme luminance levels and two single-eye images including greater numbers of pixels with the extreme luminance levels are selected as nearly-in-focus single-eye images.

Figure 12:
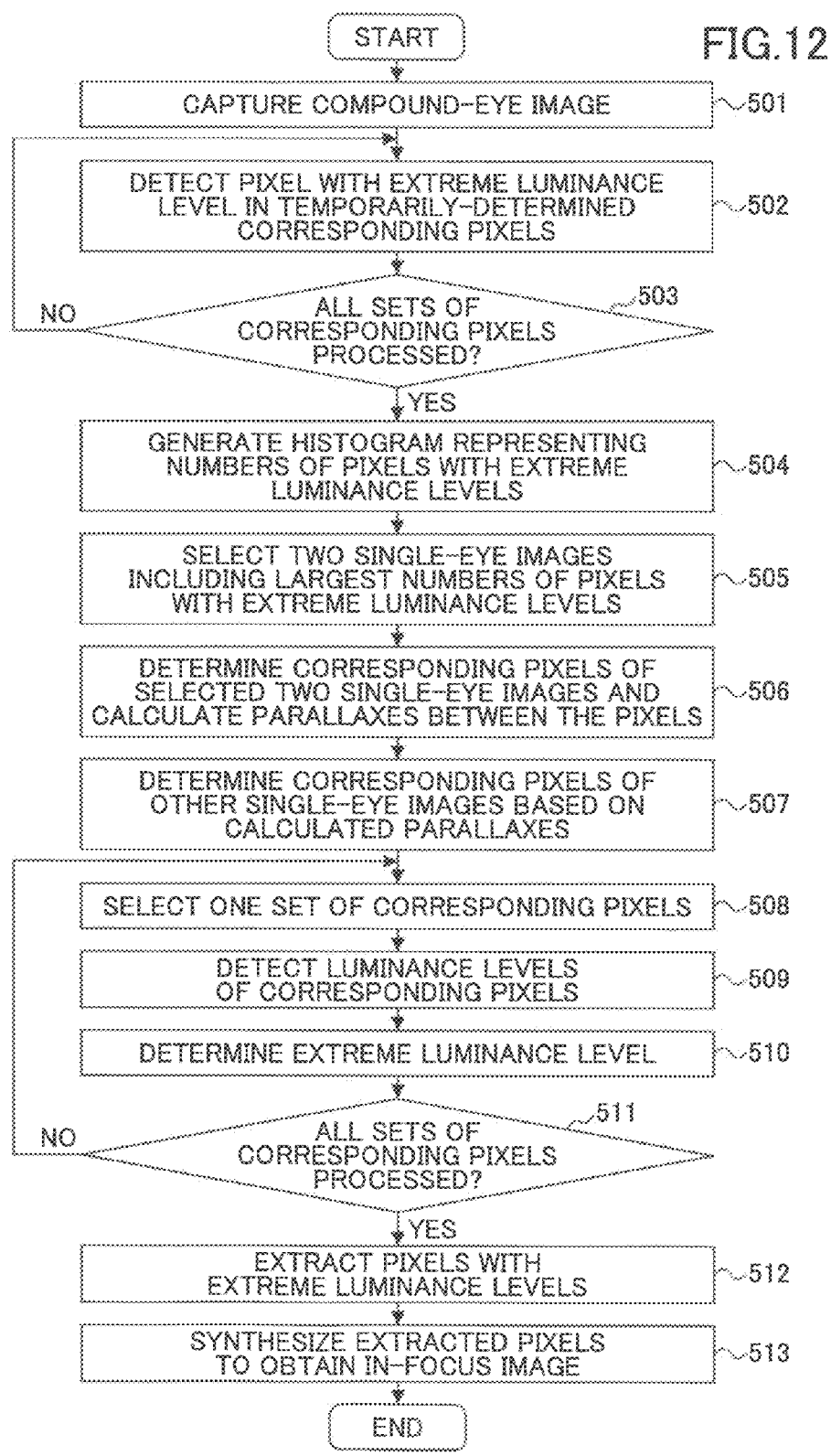
FIG. 12 is a flowchart showing a process of extracting an in-focus image according to a fourth embodiment.

FIG. 12 is a flowchart showing a process of extracting an in-focus image according to the fourth embodiment. The image capturing unit 11 captures (or receives) the compound-eye image 8 shown in FIG. 7 obtained by the image sensor 4 and separates the compound-eye image 8 into the single-eye images $I_1$ through $I_6$ (step 501). The image capturing unit 11 transfers the single-eye images $I_1$ through $I_6$ to the in-focus image extracting unit 12.

The in-focus image extracting unit 12 determines pixels (points) with the extreme luminance levels in the corresponding pixels (points) of the single-eye images $I_1$ through $I_6$ (steps 502 and 503). That is, the in-focus image extracting unit 12 determines a pixel (point) with the extreme luminance level in each set of corresponding pixels (points) that are temporarily determined without taking into account the parallaxes. The extreme luminance level is determined in a manner similar to steps 302 through 305 of FIG. 10. Next, the in-focus image extracting unit 12 generates a histogram representing the numbers of pixels with the extreme luminance levels in the single-eye images (step 504) and selects two of the single-eye images including the largest numbers of pixels with the extreme luminance levels (step 505). Subsequent steps 506 and 507 correspond to steps 403 and 404 of FIG. 11, and steps 508 through 513 correspond to steps 405 through 410 of FIG. 11 (or steps 302 through 307 of FIG. 10). Therefore, descriptions of those steps are omitted here.

In this embodiment, two single-eye images that are nearly in focus are used to determine the corresponding pixels (or points) based on the parallaxes. This method makes it possible to more accurately determine the corresponding points.

Although various embodiments of the present invention are described above, the present invention is not limited to the described embodiments. For example, although the lens array 1 shown in FIGS. 1 and 2 includes six lens sets 111 through 161 having different radii of curvature and substantially the same back focal length, the number of lens sets is not limited to six.

An imaging device according to another embodiment of the present invention is described below with reference to FIGS. 13 and 14. In this embodiment, the lens array 1 of the imaging device includes two lens sets 171 and 181. Components in FIGS. 13 and 14 and the corresponding components in FIGS. 1 and 2 have the same reference numbers.

Figure 15:
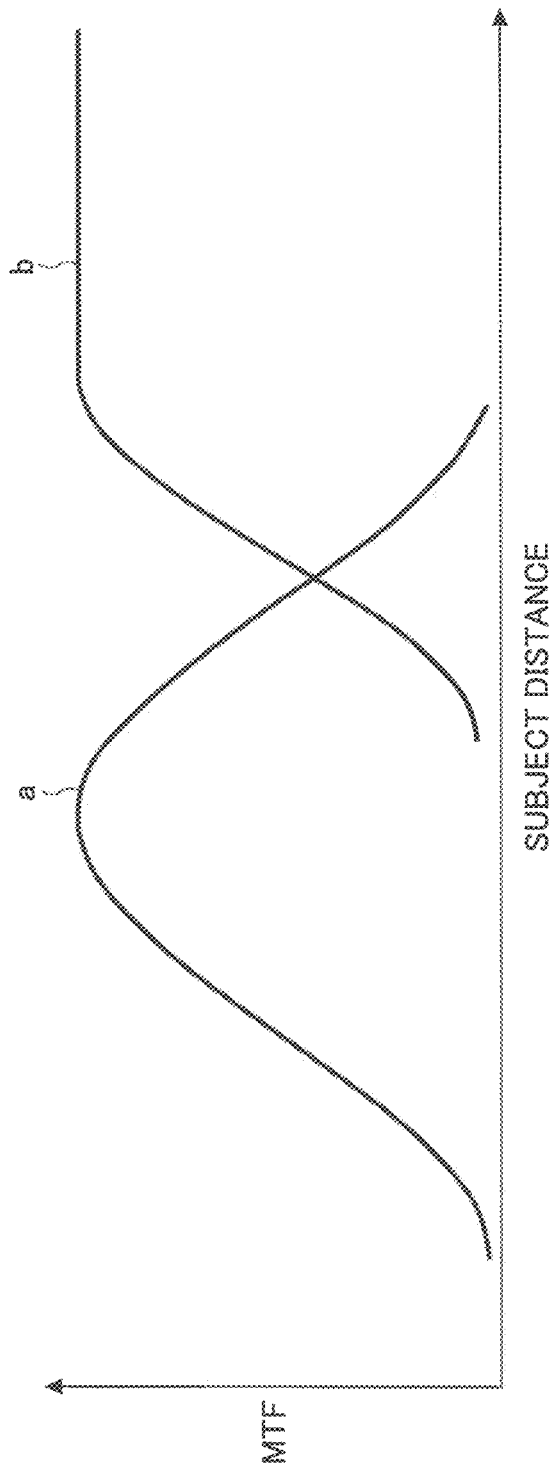
FIG. 15 is a graph showing through-focus MTFs of lens sets constituting the lens array of the imaging device shown in FIG. 13.

Similar to the configuration of FIGS. 1 and 2, lens surfaces of the lens sets 171 and 181 of the lens array 1 have different radii of curvature so that the lens sets 171 and 181 focus at different subject distances. FIG. 15 is a graph showing through-focus modulation transfer functions (MTF) of the lens sets 171 and 181. In FIG. 15, "a" indicates the through-focus MTF of the lens set 171 and "b" indicates the through-focus MTF of the lens set 181. Since the lens sets 171 and 181 focus at different subject distances, the MTFs of the lens sets 171 and 181 show peaks at different subject distances. In this embodiment, the lens sets 171 and 181 are configured such that their through-focus MTFs cross each other at a certain contrast level as shown in FIG. 15, and a single-eye image or a pixel obtained by a lens having an appropriate MTF is selected according to the subject distance. This configuration makes it possible to focus on a subject at any distance from a very short distance to infinity.

Also in this embodiment, the lens sets 171 and 181 have substantially the same back focal length. When the lens sets 171 and 181 have substantially the same back focal length, the optical magnifications of the lens sets 171 and 181 are determined substantially solely by the subject distance. Therefore, even when the degrees of focus (or defocus) of images formed by the lens sets 171 and 181 are different, the sizes of the images are substantially the same.

Figure 13:
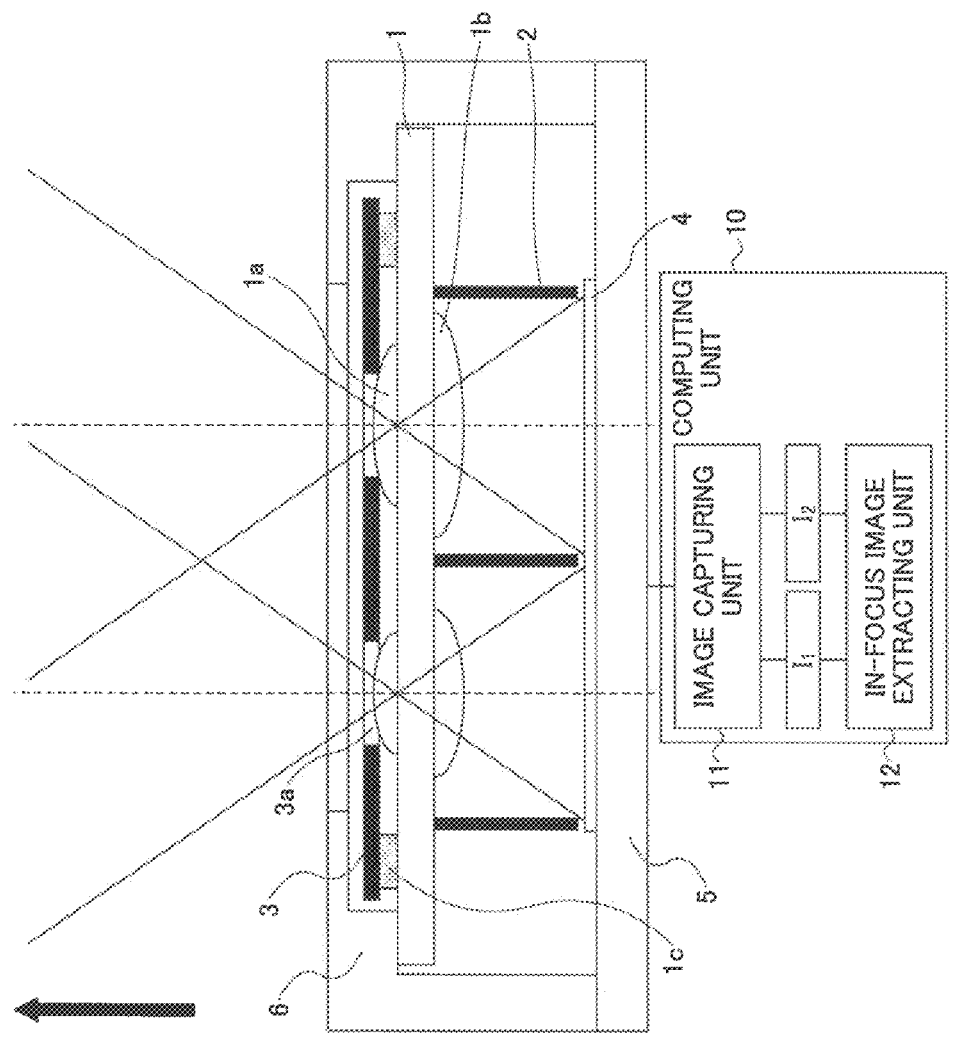
FIG. 13 is a drawing illustrating a configuration of an imaging device according to another embodiment of the present invention.
Figure 14:
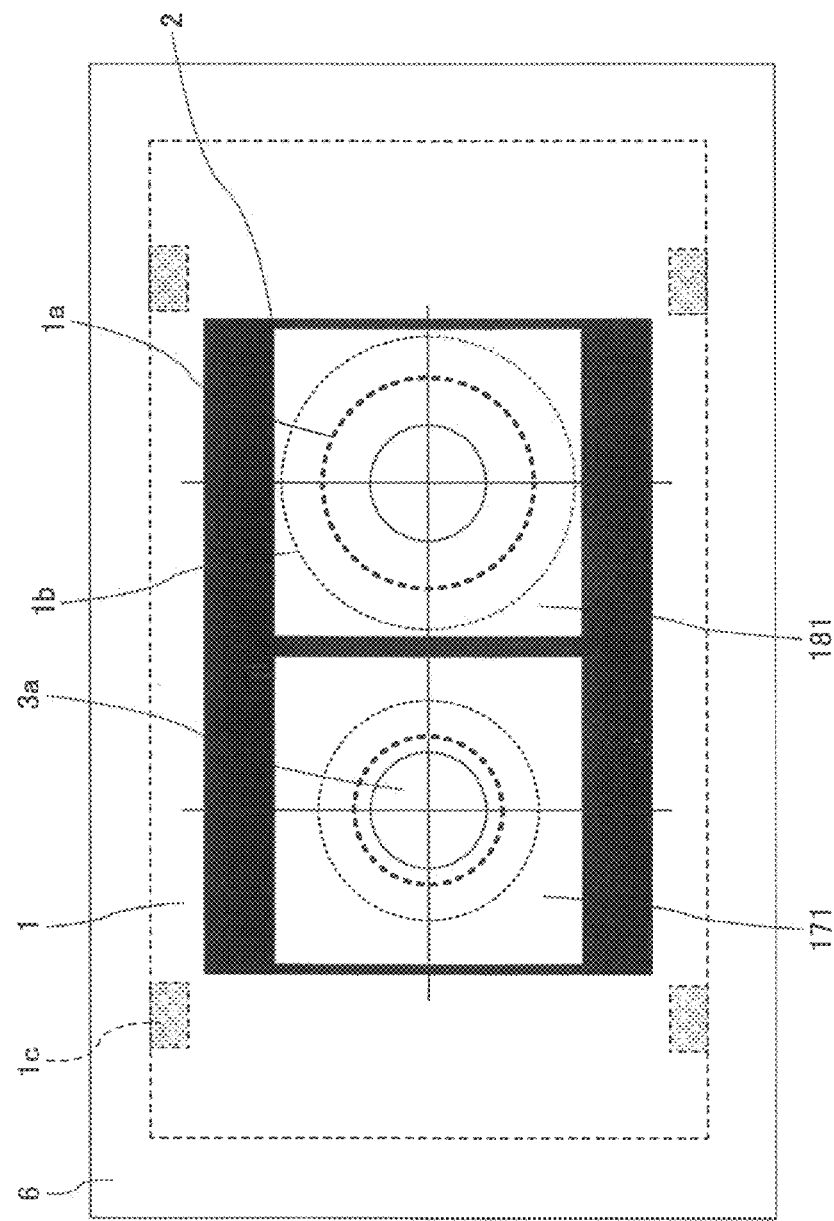
FIG. 14 is a drawing of a surface of a lens array shown in FIG. 13.
Figure 16:
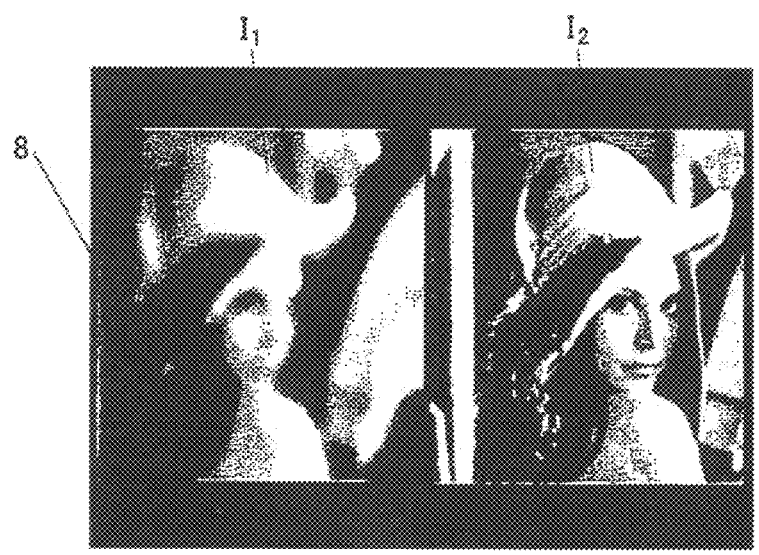
FIG. 16 is an exemplary compound-eye image obtained through the lens array of the imaging device shown in FIG. 13.

FIG. 16 shows an exemplary compound image 8 obtained by the imaging unit shown in FIGS. 13 and 14. The compound eye image 8 includes a single-eye image $I_1$ corresponding to the lens set 171 and a single-eye image $I_2$ corresponding to the lens set 181. Since the lens sets 171 and 181 have substantially the same back focal length, the imaging distances and the optical magnifications of the lens sets 171 and 181 become substantially the same. Therefore, the sizes of the single-eye images $I_1$ and $I_2$ are substantially the same. Meanwhile, since the lens sets 171 and 181 focus at different subject distances depending on the radii of curvature of the lenses, the degrees of focus (the degrees that images are in focus) of the single-eye images $I_1$ and $I_2$ are different from each other. In FIG. 16, the single-eye image $I_2$ is in focus.

The operations of the computing unit 10 of this embodiment are basically the same as those of the computing unit 10 shown in FIG. 1. However, since only two single-eye images are processed in this embodiment, the method of the first embodiment shown by FIG. 8 is particularly suitable for the computing unit 10 of this embodiment. Accordingly, the configuration of this embodiment makes it possible to obtain an in-focus image through a simple process.

As described above, an aspect of the present invention makes it possible to provide an imaging device that can obtain an in-focus image of a subject at any subject distance without using moving parts and without complicating the device configuration and the image processing. This in turn makes it possible to provide a thin, small, and low-cost imaging device.

The present invention is not limited to the specifically disclosed embodiments, and variations and modifications may be made without departing from the scope of the present invention.

The present application is based on Japanese Priority Application No. 2009-276732, filed on Dec. 4, 2009, the entire contents of which are hereby incorporated herein by reference.

What is claimed is:

1. An imaging device, comprising:
   a lens array including a plurality of compound lenses facing a subject,
      wherein a compound lens comprises a subject-side lens and an image-side lens on a same axis;
   an opening array disposed to face one surface of the lens array and having circular openings with substantially a same diameter, the openings of the opening array disposed to face the corresponding compound lenses such that effective diameters of the compound lenses become substantially a same;

an image sensor obtaining a compound-eye image including single-eye images of the subject formed by the compound lenses; and a computing unit processing the compound-eye image obtained by the image sensor, wherein the compound lenses have different radii of curvature, substantially a same back focal length and substantially a same sag the computing unit extracts an in-focus image from the compound-eye image, the back focal length is the distance between an apex of an image-side surface of the image-side lens and an image plane, the computing unit includes
- an image capturing unit separating the compound-eye image into the single-eye images; and
- an in-focus image extracting unit extracting the in-focus image from the single-eye images, and the in-focus image extracting unit extracts one of the single-eye images that is most in focus as the in-focus image, calculates a difference between a highest luminance level and a lowest luminance level of pixels for each of the single-eye images, and extracts one of the single-eye images where the difference is the highest as the in-focus image.

2. The imaging device as claimed in claim 1, wherein the lens array includes protrusions to which the opening array is bonded, the protrusions determining a position of the opening array in a direction of an optical axis of the lenses.

3. The imaging device as claimed in claim 1, wherein the in-focus image extracting unit extracts a pixel that is most in focus from each set of corresponding pixels of the single-eye images and synthesizes the in-focus image from a plurality of the extracted pixels.

4. The imaging device as claimed in claim 3, wherein the in-focus image extracting unit extracts a pixel with an extreme luminance level as the pixel that is most in focus from the each set of the corresponding pixels corresponding to a same field of view and synthesizes the in-focus image from the plurality of the extracted pixels.

5. The imaging device as claimed in claim 4, wherein the in-focus image extracting unit obtains an approximate curve of luminance levels of the each set of the corresponding pixels and uses an extreme value of the approximate curve as the extreme luminance level.

6. The imaging device as claimed in claim 4, wherein the in-focus image extracting unit obtains parallaxes between the single-eye images and determines the each set of the corresponding pixels based on the obtained parallaxes before extracting the pixel with the extreme luminance level from the each set of the corresponding pixels.

7. The imaging device as claimed in claim 6, wherein the in-focus image extracting unit detects pixels with extreme luminance levels in respective sets of temporarily-determined corresponding pixels of the single-eye images, selects two or more of the single-eye images that are nearly in focus based on the determination results, and obtains the parallaxes using the selected two or more of the single-eye images.

8. The imaging device as claimed in claim 1, wherein light shielding walls made of opaque material form rectangular spaces corresponding to the compound lenses of the lens array and are bonded to a flat part of an image-side surface of the lens array.

* * * * *